US011983919B2

(12) United States Patent
Yu et al.

(10) Patent No.: US 11,983,919 B2
(45) Date of Patent: May 14, 2024

(54) VIDEO ANOMALY DETECTION METHOD BASED ON HUMAN-MACHINE COOPERATION

(71) Applicant: Northwestern Polytechnical University, Shaanxi (CN)

(72) Inventors: Zhiwen Yu, Shaanxi (CN); Fan Yang, Shaanxi (CN); Qingyang Li, Shaanxi (CN); Bin Guo, Shaanxi (CN)

(73) Assignee: Northwestern Polytechnical University, Xi'an (CN)

( * ) Notice: Subject to any disclaimer, the term of this patent is extended or adjusted under 35 U.S.C. 154(b) by 292 days.

(21) Appl. No.: 17/727,728

(22) Filed: Apr. 23, 2022

(65) Prior Publication Data

US 2022/0245945 A1 Aug. 4, 2022

Related U.S. Application Data

(63) Continuation of application No. PCT/CN2020/110579, filed on Aug. 21, 2020.

(30) Foreign Application Priority Data

Mar. 5, 2020 (CN) .......................... 202010148420.X

(51) Int. Cl.
*G06V 10/778* (2022.01)
*G06F 16/78* (2019.01)
(Continued)

(52) U.S. Cl.
CPC ...... *G06V 10/7788* (2022.01); *G06F 16/7867* (2019.01); *G06F 18/2178* (2023.01);
(Continued)

(58) Field of Classification Search
None
See application file for complete search history.

(56) References Cited

U.S. PATENT DOCUMENTS

| 2019/0188882 A1* | 6/2019 | Son .......................... G06T 3/04 |
| 2020/0210780 A1* | 7/2020 | Torres ................. G06F 18/2178 |

(Continued)

FOREIGN PATENT DOCUMENTS

| CN | 109615019 A | * | 4/2019 | ........... G06K 9/4652 |
| CN | 110177108 A | * | 8/2019 | ............... G06N 3/08 |

OTHER PUBLICATIONS

WIPO ISR and Report on Patentability for PCT/CN2020/110579, May 9, 2022, WIPO PCT pp. 1-7 (Year: 2022).*

(Continued)

*Primary Examiner* — Emily C Terrell
*Assistant Examiner* — Nathan J Bloom
(74) *Attorney, Agent, or Firm* — Westbridge IP LLC

(57) ABSTRACT

The disclosure relates to a video anomaly detection method based on human-machine cooperation, in which video frames and traditional descriptors of optical stream of an image are utilized as an input for auto-encoder neural network coding, and converted into a representation content of a hidden layer, and then the representation content of the hidden layer is decoded, reconstructed and output. The auto-encoder network is trained with normal samples. In a test stage, if an input is a normal sample, a final reconstructed error keeps high similarity with an input sample; on the contrary, if the input is an abnormal sample, the final reconstructed error deviates greatly from the input sample.

4 Claims, 2 Drawing Sheets

(51) Int. Cl.
| | |
|---|---|
| G06F 18/21 | (2023.01) |
| G06F 18/2411 | (2023.01) |
| G06N 3/0464 | (2023.01) |
| G06N 3/048 | (2023.01) |
| G06N 3/09 | (2023.01) |
| G06N 20/00 | (2019.01) |
| G06T 7/20 | (2017.01) |
| G06V 10/72 | (2022.01) |
| G06V 10/74 | (2022.01) |
| G06V 10/82 | (2022.01) |
| G06V 20/40 | (2022.01) |
| G06V 20/52 | (2022.01) |

(52) U.S. Cl.
CPC ....... *G06F 18/2411* (2023.01); *G06N 3/0464* (2023.01); *G06N 3/048* (2023.01); *G06N 3/09* (2023.01); *G06N 20/00* (2019.01); *G06T 7/20* (2013.01); *G06V 10/72* (2022.01); *G06V 10/74* (2022.01); *G06V 10/82* (2022.01); *G06V 20/44* (2022.01); *G06V 20/47* (2022.01); *G06V 20/52* (2022.01); *G06T 2207/10016* (2013.01); *G06T 2207/20084* (2013.01); *G06T 2207/20092* (2013.01)

(56) References Cited

U.S. PATENT DOCUMENTS

2020/0244969 A1* 7/2020 Bhorkar ............... G06N 3/045
2023/0195845 A1* 6/2023 Dasgupta ............... G06N 5/04
706/12

OTHER PUBLICATIONS

C. Huang et al., "Self-Supervised Attentive Generative Adversarial Networks for Video Anomaly Detection," in IEEE Transactions on Neural Networks and Learning Systems, vol. 34, No. 11, pp. 9389-9403, Nov. 2023, doi: 10.1109/TNNLS.2022.3159538. (Year: 2022).*

Mohammadi B, Fathy M, Sabokrou M. Image/video deep anomaly detection: A survey. arXiv preprint arXiv:2103.01739. Mar. 2, 2021. (Year: 2021).*

Ye M, Peng X, Gan W, Wu W, Qiao Y. Anopen: Video anomaly detection via deep predictive coding network. InProceedings of the 27th ACM international conference on multimedia Oct. 15, 2019 (pp. 1805-1813). (Year: 2019).*

Akcay S, Atapour-Abarghouei A, . "Ganomaly: Semi-supervised anomaly detection via adversarial training". InComputer Vision-ACCV 2018: 14th Asian Conference on Computer Vision, Perth, Australia, Dec. 2-6, 2018, Revised Selected Papers, Part III 14 2019 (pp. 622-637). Springer International (Year: 2019).*

Yang Y, Fu Z, Naqvi SM. Enhanced adversarial learning based video anomaly detection with object confidence and position. In2019 13th International Conference on Signal Processing and Communication Systems (ICSPCS) Dec. 16, 2019 (pp. 1-5). IEEE. (Year: 2019).*

* cited by examiner

VIDEO ANOMALY DETECTION METHOD BASED ON HUMAN-MACHINE COOPERATION

CROSS-REFERENCE TO RELATED APPLICATION(S)

This application claims priority to and the benefit of Chinese Patent Application Serial No. 202010148420.x, filed Mar. 5, 2020, the entire disclosure of which is hereby incorporated by reference.

TECHNICAL FIELD

The disclosure belongs to a field of video anomaly detection, and particularly to a video anomaly detection method based on a human-machine cooperation.

BACKGROUND

With rapid development of information technology and Internet of Things, more and more monitoring devices are deployed in towns and roads (such as residential buildings, shopping malls, office buildings, streets and highway areas, etc.). Deployment of numerous monitoring facilities provides invisible guarantee for public property and personal safety, at the same time, a quantity of monitoring video data is also produced, and therefore, it is a demand faced with many applications to quickly and efficiently find videos with specific requirements in huge video data. Video anomaly detection is an important branch in computer vision, playing an important role in theoretical research and practical application. Currently, there are mainly two types of anomaly detection, one is detecting anomaly in specific scenes based on descriptors of manually extracted features according to specific requirements, in which detection performance is closely related to quality of manual extraction of the features; the other one is a method based on deep learning after 2012, in which more hidden features that human cannot estimate are learned from video frames with a neural network model, thus greatly improving an accuracy and speed of the anomaly detection.

In current video anomaly detection methods, although the detection accuracy is improved, numerous samples are needed to train a detection model, and there are considerable false alarms in testing results of various models. In order to improve the detection accuracy, it is necessary to constantly adjust the detection model, which is time-consuming and labor-intensive to meet requirements in some high real-time tasks. In addition, the current video anomaly detection methods are based on data distribution, model parameters, sample selection and so on, for objects that some people can easily identify, the model needs to be iterated and optimized constantly so as to improve detection (identification) effect.

SUMMARY

Technical Problems to be Solved

In order to avoid shortcomings of the prior art and improve detection accuracy, the disclosure provides a video anomaly detection method based on human-machine cooperation.

Technical Solution

A video anomaly detection method based on human-machine cooperation, comprising following steps:

Step 1: for video sequences to be detected, analyzing their parameters including length, scene, start and end range of abnormal video; ascertaining abnormal objects and types; and dividing the video into video sequences with a certain length by performing a framing operation;

Step 2: grouping the video sequences divided in step 1 into a training set and a testing set, the training set not including any one of abnormal video sequences, and the testing set including normal and abnormal video sequences;

Step 3: training on the training set with a auto-encoder model, adjusting parameters of a model in a certain time window, and partitioning video frames and optical stream data input to the model, which then are subjected to convolution and pooling by an encoder, and deconvolution and pooling by a decoder; Euclidean loss with L2 regularization as shown in formula (1) being used as a target function for a rectangular composed of multiple video frames in a time dimension, which indicates an Euclidean distance between a video block $f_{rec}(X_i)$ after reconstruction of N blocks in the video sequence and an input video block $X_i$, in which $\gamma$ indicates an adjustment factor for 2 successive added terms, and W is a weight learned by the auto-encoder neural network; and optimizing the target function to obtain a trained model;

$$\hat{f_{rec}} = \operatorname*{argmin}_{W} \frac{1}{N} \sum_{i=1}^{N} \|X_i - f_{rec}(X_i)\|_2^2 + \gamma \|W\|_2^2 \qquad (1)$$

Step 4: calculating a total error value $$e(t) = \sum_{(x,y)} e(x, y, t)$$

of each pixel value I in a frame t at a position (x, y), a reconstructed error of each pixel at a position (x, y) being represented with a formula (2):

$$e(x,y,t) = \|I(x,y,t) - f_W(I(x,y,t))\|_2^2 \qquad (2)$$

wherein, I(x, y, t) indicates a value of a pixel I in the frame t at the position (x, y), and $f_W(I(x, y, t))$ indicates a pixel value after the reconstruction;

calculating an abnormal score of each frame for judging whether it is abnormal:

$$a(t) = \frac{e(t) - \min_t e(t)}{\max_t e(t)} \qquad (3)$$

where, $\min_t e(t)$ and $\max_t e(t)$ respectively indicate total error values corresponding to the video frames with a lowest score and a highest score in the video sequence; setting a threshold according to whole detection results and a ratio of normal frames to abnormal frames, so that a video frame is normal if its abnormal score is smaller than the threshold, and is abnormal if its abnormal score is greater than the threshold; initiating a feedback with a certain probability for the detection results, so that one can judge whether the result is correct, and if the video frame is with a right detection, it will be directly output as a final result, and if the video frame is with a wrong detection, one can mark it; and Step 5: collecting video frames with wrong detections in step 4 and storing in a buffer, sending the collected video frames to the auto-encoder model after a number of the collected video frames reaches a certain number, and making appropriate adjustments to the parameters, thus improving detection accuracy for similar video frames in a subsequent test.

A ratio of the training set to the testing set in step 2 is 4:6.

The partitioning in step 3 are made in 15*15 pixels, 18*18 pixels or 20*20 pixels.

The certain probability in step 4 is 0.1.

Beneficial Effects

In the disclosure, a human feedback is added to conventional video anomaly detection, and an expert confirmation is carried out for video frames that initiate the feedback, especially for a video frame that is greater than a threshold, the expert may modify and mark a result of an algorithm detection with his cognitive when an abnormal target is obscured largely in the video, false warning (which is normal but judged as abnormal by the algorithm) and missed detection (which is abnormal but not detected) can be calibrated. In final results, detection accuracy is improved without updating the detection model, which has a practical application value.

Nowadays, numerous pictures and videos are generated everyday, if cognitives, analyzing and reasoning abilities of human can be integrated, and a certain amount of marks for abnormal videos are marked, efficient and fast detection results can be achieved in combination with machine learning algorithms. The disclosure provides a video anomaly detection method combined with human feedback. In this method, natural cognitive for abnormity of human (with expertise) is combined with processing results of a machine learning model. The threshold is set for the results. The feedback is initiated with a certain probability. The expert confirmation is carried out for the results with right detection, which are output directly, and a marking is made for the results with wrong detection, which then are returned to an input of the model for processing. In this processing model, a novel method is provided against previous abnormal video detection algorithms, in which advantages of human cognitives and analysis are combined with a fast processing of a neural network, thus improving the detection accuracy.

DETAILED DESCRIPTION

The disclosure will be further described in combination with following embodiments and figures.

The disclosure provides a video anomaly detection method based on human-computer cooperation. Video frames and traditional descriptors of optical stream of an image are utilized as an input for auto-encoder neural network coding, and converted into a representation content of a hidden layer, and then the representation content of the hidden layer is decoded, reconstructed and output. The auto-encoder network is trained with normal samples. In a test stage, if an input is a normal sample, a final reconstructed error keeps high similarity with an input sample; on the contrary, if the input is an abnormal sample, the final reconstructed error deviates greatly from the input sample. An appropriate threshold is set, if the reconstructed error is smaller than the threshold, it is considered normal, and if the reconstructed error is greater than the threshold, it is considered abnormal. Then a feedback is requested with a certain probability, a video frame that initiates the feedback is judged by human, if the video frame is with right detection, it can be output directly, and if there is a detection error, it will be marked with 1 when normal and 0 when abnormal, and then the sample with the detection error is returned to the input of the model. Through collecting a certain number of the video frames with detection error, and sending them to a neural network, the model can be updated and some similar anomalies can be detected as real anomalies in a subsequent test. Meanwhile, the abnormal video can be detected more specifically according to its start and end range, and the detection is accelerated, which has practical significance in application scenarios such as public safety and social security management.

Figure 1:
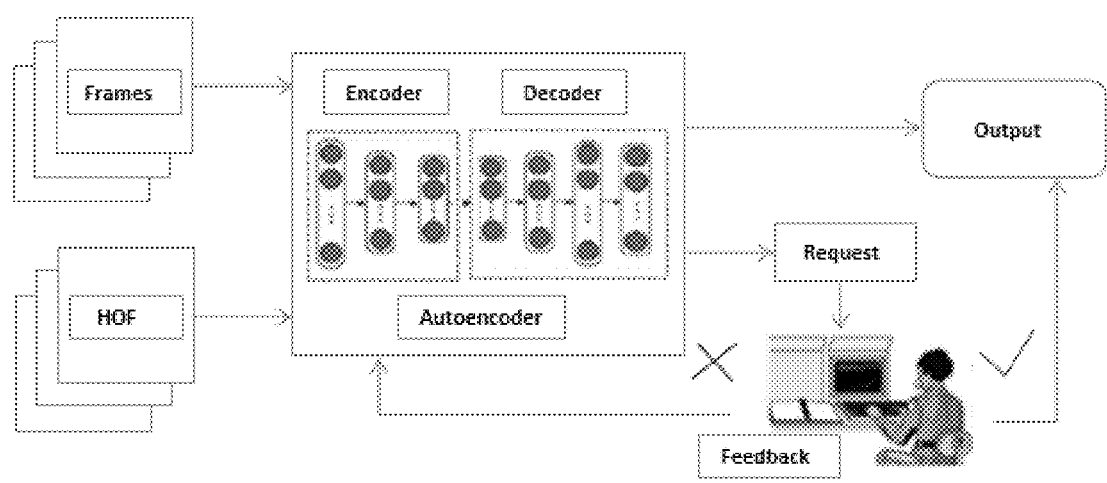
FIG. 1 is a flow chart of a video anomaly detection method based on human-computer cooperation.
Figure 2:
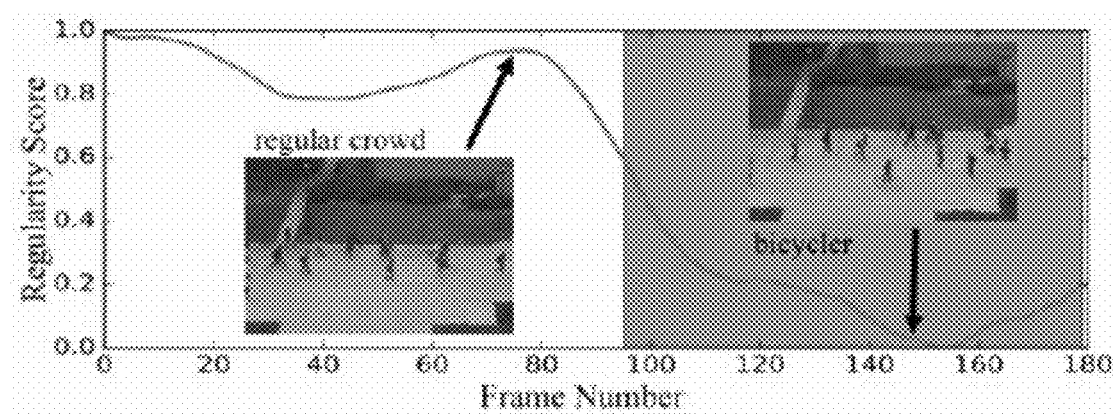
FIG. 2 is a diagram results of a video with anomalies.

As shown in FIG. 1, the method includes following steps.

In Step 1, for video sequences to be detected, their parameters are analyzed for the processing of the video sequences to be detected. Being aware of the video, the processing can be made more pertinently. Observation records include a length of the video, a scene of the video, a start and end range of an abnormal video.

And video anomalies (cars, skateboarders, cyclists, wheelchairs, runners and throwers in experimental dataset) can be determined, so as to have a clearer understanding of the video to be detected. A preprocessing such as framing is made to the video to divide the video into video sequences with a certain length (for example, 200 frames per sequence).

In Step 2, the video sequences divided in step 1 is grouped into a training set and a testing set with a ratio of usually 4:6. The training set does not including any one of abnormal video sequences, and the testing set includes normal and abnormal video sequences.

In Step 3, a training is made on the training set with a auto-encoder model, parameters of the model is made in a certain time window (N indicates a size of the window, N=10 frames or 20 frames), and the video frames and optical stream data input into the network are partitioned into 15*15 pixels, 18*18 pixels or 20*20 pixels in size, which then are subjected to convolution and pooling by an encoder, and deconvolution and pooling by a decoder. Euclidean loss with L2 regularization are used as a target function for a rectangular composed of multiple video frames in a time dimension, as shown in formula (1), which indicates an Euclidean distance between a video block $f_{rec}(X_i)$ after reconstruction of N blocks in the video sequence and an input video block $X_i$. $\gamma$ indicates an adjustment factor for 2 successive added terms, and W is a weight learned by the auto-encoder neural network. The target function is optimized to obtain a trained model.

$$\hat{f_{rec}} = \underset{W}{\arg\min} \frac{1}{N} \sum_{i=1}^{N} \|X_i - f_{rec}(X_i)\|_2^2 + \gamma \|W\|_2^2 \quad (1)$$

In Step 4, after the model is trained, A total error value $$e(t) = \sum_{(x,y)} e(x, y, t)$$

of each pixel value I in a frame t at a position (x, y) is calculated, a reconstructed error of each pixel at a position (x, y) is represented with a formula (2), and thus an abnormal score of each frame can be calculated for judging whether it is abnormal.

$$e(x,y,t)=\|I(x,y,t)-f_W(I(x,y,t))\|_2^2 \qquad (2)$$

where, I(x, y, t) indicates a value of a pixel I in the frame t at the position (x, y), and $f_W$(I(x, y, t) indicates a pixel value after the reconstruction. The abnormal score is obtained for each frame and represented as formula (3):

$$a(t) = \frac{e(t) - \min_t e(t)}{\max_t e(t)} \qquad (3)$$

where, $\min_t e(t)$ and $\max_t e(t)$ respectively indicate total error values corresponding to the video frames with a lowest score and a highest score in the video sequence. A threshold is set according to whole detection results and a ratio of normal frames to abnormal frames, so that a video frame is normal if its abnormal score is smaller than the threshold, and is abnormal if its abnormal score is greater than the threshold; a feedback is initiated with a certain probability (0.1) for the detection results, so that one (an expert) can judge whether the result is correct, and if the video frame is with a right detection, it will be directly output as a final result, and if the video frame is with a wrong detection, one can mark it. The video sequences composed of regular events have better regular (normal) scores since they are closer to a normal training data in the training set in eigenspace. On the contrary, an abnormal sequence has a lower normal score, so it may be used to locate anomalies.

In Step 5, video frames with wrong detections in step 4 are collected and stored in a buffer, the collected video frames are sent to the auto-encoder model after a number of the collected video frames reaches a certain number, and appropriate adjustments are made to the parameters, thus improving detection accuracy for similar video frames in a subsequent test.

What is claimed is:

1. A video anomaly detection method based on human-machine cooperation, comprising following steps:

Step 1: for video sequences to be detected, analyzing their parameters including length, scene, start and end range of abnormal video; ascertaining abnormal objects and types; and dividing the video into video sequences with a certain length by performing a framing operation;

Step 2: grouping the video sequences divided in step 1 into a training set and a testing set, the training set not including any one of abnormal video sequences, and the testing set including normal and abnormal video sequences;

Step 3: training on the training set with an auto-encoder model, adjusting parameters of a model in a certain time window, and partitioning video frames and optical stream data input to the model, which then are subjected to convolution and pooling by an encoder, and deconvolution and pooling by a decoder; Euclidean loss with L2 regularization as shown in formula (1) being used as a target function for a rectangular composed of multiple video frames in a time dimension, which indicates an Euclidean distance between a video block $f_{rec}(X_i)$ after reconstruction of N blocks in the video sequence and an input video block $X_i$, in which indicates an adjustment factor for 2 successive added terms, and γ is a weight learned by the auto-encoder neural network; and optimizing the target function to obtain a trained model;

$$\hat{f_{rec}} = \underset{W}{\mathrm{argmin}} \frac{1}{N} \sum_{i=1}^{N} \|X_i - f_{rec}(X_i)\|_2^2 + \gamma \|W\|_2^2 \qquad (1)$$

Step 4: calculating a total error value $$e(t) = \sum_{(x,y)} e(x, y, t)$$

of each pixel value I in a frame t at a position (x, y), a reconstructed error of each pixel at a position (x,y) being represented with a formula (2)

$$e(x,y,t)=\|I(x,y,t)-f_W(I(x,y,t))\|_2^2 \qquad (2)$$

wherein, I(x,y,t) indicates a value of a pixel I in the frame t at the position (x,y), and $f_W$(I(x,y,t) indicates a pixel value after the reconstruction;

calculating an abnormal score of each frame for judging whether is abnormal:

$$a(t) = \frac{e(t) - \min_t e(t)}{\max_t e(t)} \qquad (3)$$

where, $\min_t e(t)$ and $\max_t e(t)$ respectively indicate total error values corresponding to the video frames with a lowest score and a highest score in the video sequence; setting a threshold according to whole detection results and a ratio of normal frames to abnormal frames, so that a video frame is normal if its abnormal score is smaller than the threshold, and is abnormal if its abnormal score is greater than the threshold; initiating a feedback with a certain probability for the detection results, generating a user's feedback judging whether the result is correct, and if the video frame is with a right detection, it will be directly output as a final result, and if the video frame is with a wrong detection, receiving a user's feedback marking the result is incorrect; and Step 5: collecting video frames with wrong detections in step 4 and storing in a buffer, sending the collected video frames to the auto-encoder model after a number of the collected video frames reaches a certain number, and making appropriate adjustments to the parameters, thus improving detection accuracy for similar video frames in a subsequent test.

2. The method according to claim 1, wherein the ratio of the training set to the testing set in the step 2 is 4:6.

3. The method according to claim 1, wherein the partitioning in the step 3 are made in 15*15 pixels, 18*18 pixels or 20*20 pixels.

4. The method according to claim 1, wherein the certain probability in the step 4 is 0.1.

* * * * *